(12) United States Patent
Smith et al.

(10) Patent No.: US 6,189,663 B1
(45) Date of Patent: Feb. 20, 2001

(54) SPRAY COATINGS FOR SUSPENSION DAMPER RODS

(75) Inventors: John Robert Smith, Birmingham; Wen-Jin Meng, Novi; Thomas Hubert Van Steenkiste, Ray, all of MI (US)

(73) Assignee: General Motors Corporation, Detroit, MI (US)

( * ) Notice: Under 35 U.S.C. 154(b), the term of this patent shall be extended for 0 days.

(21) Appl. No.: 09/093,565

(22) Filed: Jun. 8, 1998

(51) Int. Cl.$^7$ .................................................. F16F 9/00
(52) U.S. Cl. ...................................................... 188/322.22
(58) Field of Search ......................... 188/322.22, 322.11, 188/315; 427/226, 228, 453; 428/548, 550, 610; 219/243; 239/81

(56) References Cited

U.S. PATENT DOCUMENTS

| | | | |
|---|---|---|---|
| 3,007,550 | * 11/1961 | Long, Jr. ........................ | 188/322.22 |
| 3,695,149 | * 10/1972 | Eberhart ................................ | 92/168 |
| 3,723,165 | 3/1973 | Longo, et al. . | |
| 4,397,452 | * 8/1983 | Fouts ................................ | 188/322.22 |
| 4,526,839 | * 7/1985 | Herman et al. ...................... | 428/550 |
| 4,557,808 | * 12/1985 | Strunck et al. ........................ | 204/29 |
| 4,592,964 | * 6/1986 | Buran et al. .......................... | 428/610 |
| 4,669,658 | * 6/1987 | Nevgod et al. ........................ | 239/81 |
| 4,678,511 | 7/1987 | Yasuoka et al. . | |
| 4,692,305 | * 9/1987 | Rangaswamy et al. ............. | 420/436 |
| 4,822,689 | * 4/1989 | Fukubayashi et al. .............. | 428/472 |
| 4,974,498 | * 12/1990 | Lemelson ................................ | 92/223 |
| 5,077,139 | 12/1991 | Van der Heyden . | |
| 5,196,471 | * 3/1993 | Rangaswamy et al. ............. | 524/406 |
| 5,338,577 | * 8/1994 | Burdette, II .......................... | 427/453 |
| 5,480,536 | * 1/1996 | Suehiro et al. ....................... | 205/151 |
| 5,504,307 | * 4/1996 | Hayashi et al. ....................... | 219/543 |
| 5,558,908 | * 9/1996 | Lukacs, III et al. ................. | 427/228 |
| 5,778,918 | * 7/1998 | McLelland ............................ | 137/15 |
| 5,810,130 | * 9/1998 | Mc Candless ................... | 188/322.22 |
| 6,000,627 | * 12/1999 | Chernyshov .......................... | 239/81 |

FOREIGN PATENT DOCUMENTS

| | | |
|---|---|---|
| 0053521 | 9/1982 | (EP) . |
| 609644 | 10/1948 | (GB) . |
| 1120299 | 7/1968 | (GB) . |
| 58-146762 | 1/1983 | (JP) . |
| 60023671 | 6/1985 | (JP) . |

OTHER PUBLICATIONS

Herman, "Plasma–Sprayed Coatings," *Scientific American*, Sep. 1988, pp. 112–117.

Leivo et al, "Wear and Corrosion Properties of Plasma Sprayed $Al_2O_3$ and $Cr_2O_3$ Sealed by Aluminum Phosphates," *Journal of Thermal Spray Technology*, vol. 6(2), Jun. 1997, pp. 205–210.

* cited by examiner

Primary Examiner—Robert J. Oberleitner
Assistant Examiner—Melanie Talavera
(74) Attorney, Agent, or Firm—Robert M. Sigler

(57) ABSTRACT

Electroplated chromium coatings on automobile suspension damper piston rods are replaced with thermal or kinetic spray coatings of: (a) suitable corrosion-resistant metal alloys such as iron and chromium containing nickel-based alloys or chromium containing steels, or (b) suitable ceramic coatings such as electrically insulative alumina ceramics. The spray coatings are porous, and the metal alloy coatings usually should be sealed for corrosion protection.

6 Claims, 1 Drawing Sheet

SPRAY COATINGS FOR SUSPENSION DAMPER RODS

TECHNICAL FIELD

This invention relates to piston rods for automobile shock absorbers and suspension struts. More specifically, it relates to the provision of thermal and kinetic spray coatings, instead of electrodeposited chromium, on such rods for corrosion protection and abrasion resistance.

BACKGROUND OF THE INVENTION

Automotive vehicles are suspended on springs to reduce the loads or vertical accelerations transmitted from the wheel to the body and its occupants. Springs store and release the energy imparted to the vehicle from the road surface. Cars and trucks also use suspension dampers (also known as shock absorbers and suspension struts) to convert the kinetic energy of the vehicle and springs into thermal energy and dissipate it to the atmosphere and the vehicle chassis. Such suspension dampers are necessary for the safety and comfort of the occupants of the vehicle.

Suspension dampers usually come in two forms on automotive vehicles, and a plurality of the dampers are used on each vehicle. A shock absorber is typically a hydraulic device that controls the sprung and unsprung masses of the vehicle by converting the kinetic energy into thermal energy. It is usually used in combination with a spring operating between the vehicle chassis and an axle to dampen the compression of the spring. A strut damper is more of a structural member of an automotive system that is designed to be capable of withstanding the forces and bending moments resulting from braking, acceleration and handling maneuvers. A strut damper, of course, also serves as a shock absorber. A typical shock absorber or strut damper comprises a cylindrical piston rod that slides in and out of a cylinder tube in sealing engagement with a closure portion of the tube. One end of the tube and one end of the piston rod are respectively connected to the chassis and axle. The other end of the rod is connected to a suitable piston structure that reciprocates within the tube. The piston, of course, displaces hydraulic fluid which is the shock absorbing medium of the device.

Piston rods for shock absorbers, strut dampers and the like are produced by the millions each year. Typically, the rods are formed of a suitable steel to provide the strength for its function. The exposed portion of the rod outside of the damper cylinder tube encounters water, salt, air and other aggressive materials that can cause corrosion of the rod. Since the rod must have a true round sealable surface for engagement with the seal portion of the device, corrosion must be minimized. For this reason, piston rods have traditionally been provided with an electroplated chromium coating. The chromium coating provides both corrosion resistance in the environment in which the damper operates and some abrasion resistance for the engagement of the rod with the sealing portion of the damper cylinder. Such electroplated chromium coatings have served well in damper piston rods for years. However, the hexavalent chromium plating bath and vapors are toxic to workers and present a disposal problem in the environment. There is a need for an alternative to the electroplated chromium coating practice for protecting automotive suspension damper piston rods.

SUMMARY OF THE INVENTION

This invention provides certain metallic and ceramic thermal and kinetic sprayed coatings on piston rods for automotive suspension dampers. These cylindrical shafts are typically made of a suitably strong, load bearing metal alloy such as a carbon steel. In accordance with the invention, a thermal spray or kinetic spray coating of an alloy is applied that is resistant to corrosion in the wet and often salty environment encountered by the automobile underbody. The coating is also resistant to abrasion as the rod slides in and out of the end closure means of the damper cylinder. Suitable alloys for thermal spray application include, e.g., nickel-chromium-iron alloys, iron-chromium-carbon alloys and iron-chromium alloys. Chromium-containing alloys are preferred. In another embodiment of the invention, suitable thermal spray coating materials include alumina-based ceramics.

Suitable thermal spray application processes include plasma spray, wire arc spray, high velocity oxy-fuel spray and flame spray processes. In these thermal spray processes, the wire or powdered starting material is melted in a gun and rapidly transported to a workpiece where it is deposited as individual molten droplets. The coating is thus applied drop by drop. It solidifies drop by drop and is therefore somewhat porous. Such pores typically make up 1% to 10% of the volume of the coating. In the case of metal alloy coatings, it is usually necessary to seal the porous coating to prevent water encroachment and electrochemical corrosion. The sealing may be accomplished by infiltration of the pores with a suitable polymer or by momentary thermal reflow of the metal alloy coating to fill the pores. In the case of ceramic coatings, especially electrically insulative alumina-based coatings, the sealing step is usually unnecessary. The alumina coatings may be porous but do not present a corrosive potential.

Kinetic spray processes involve suspending suitable coating particles in a gaseous stream and propelling the particles at supersonic speed against a roughened substrate to be coated. The gas may be heated to increase its velocity but not to soften or melt the particles. The particles are mechanically flattened and bonded on the substrate where they adhere without phase or composition change. Sealing may also be required for kinetic spray applied metallic coatings.

It is usually preferred to grind or otherwise finish the surface of the coating to assure roundness, the specified rod diameter and, very importantly, a smooth surface to minimize abrasion of the seal member of the damper housing for sealing engagement with the enclosure means on the cylinder member of the suspension damper.

Other objects and advantages of the invention will become more apparent from the detailed description of the invention that follows. Reference will be had to the drawings.

DESCRIPTION OF THE PREFERRED EMBODIMENT

Figures 1, 2:
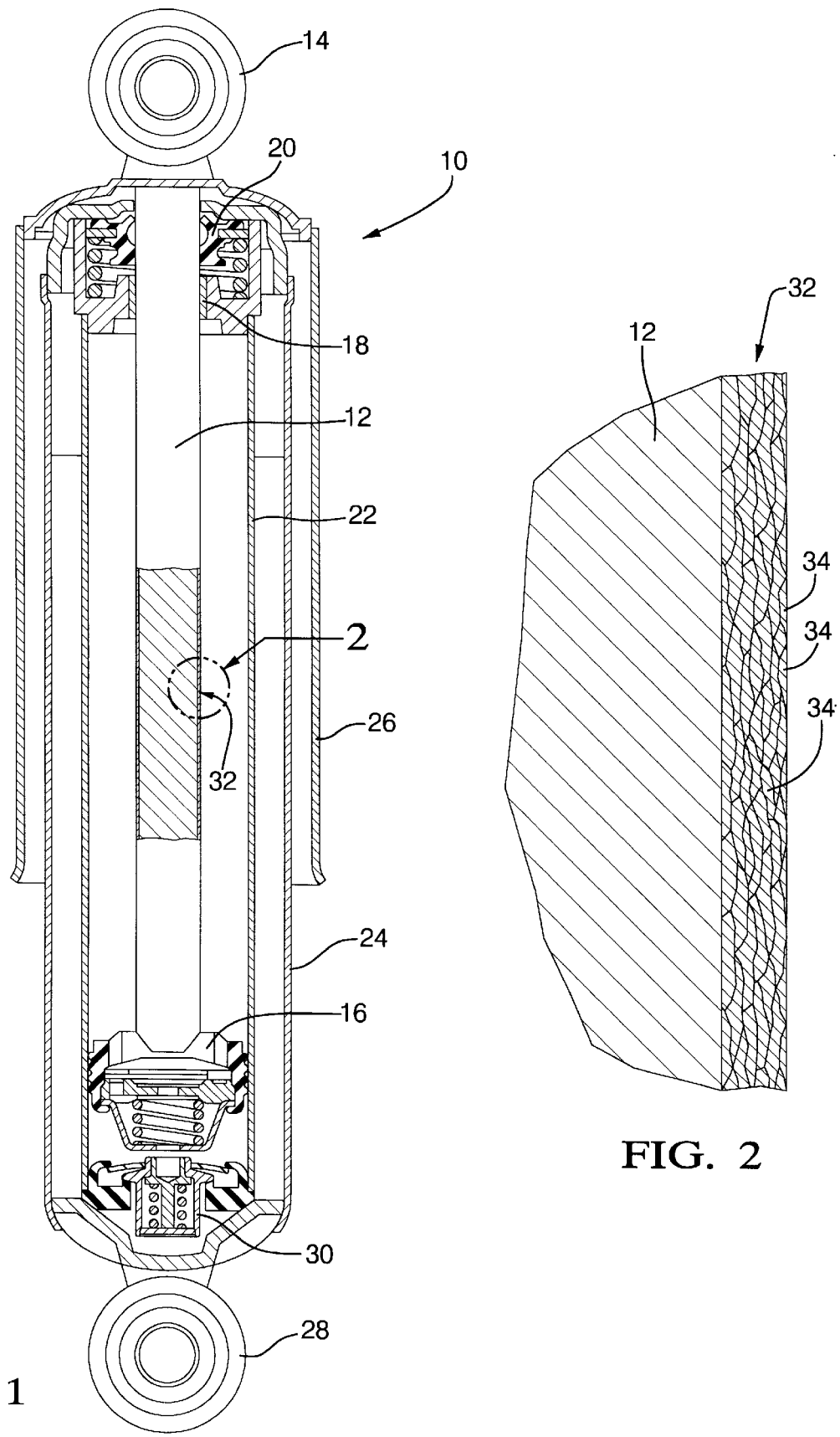
FIG. 1 is a sectional view of a representative automobile shock absorber illustrating a thermal spray coated piston rod.
FIG. 2 is an enlarged cross-sectional view of a portion of the thermal spray-coated piston rod of FIG. 1.

A representative suspension damper is shown in FIG. 1 at 10. This specific damper is a shock absorber designed for substantially linear reciprocating motion in connection with an automotive spring. However, the practice of this invention is applicable to any suspension damper piston rod including strut dampers and other like devices that employ or have employed a chromium-plated piston rod.

Referring to FIG. 1, shock absorber 10 includes a piston rod 12. Rod 12 has a cylindrical eyelet connector 14 at one end for attachment to the car or truck chassis. At the other end of rod 12 is a suitable piston 16. Rod 12 slides in sealing engagement with bushing 18 and seal 20 at one end of cylinder tube 22. Piston 16 slides in engagement with cylinder tube 22. Cylinder 22 is contained within the hydraulic fluid reservoir tube 24. Reservoir tube 24 in turn is partially covered by dust tube 26. The base ends of tubes 22 and 24 are fixed to cylindrical connector 28.

Piston rod 12 is round in cross section and must be of specified uniform roundness, diameter and surface finish along its length so as to provide a suitable sealing surface with bushing 18 and seal 20 to prevent escape of hydraulic fluid (not shown) that is pumped within the device between cylinders 22 and 24 through valve 30 and piston 16.

In the typical construction of an automobile shock absorber or strut damper piston rod, the rod 12 is made of a suitable steel composition such as UNS G10400. This is a carbon steel nominally containing by weight 0.4% carbon and 0.75% manganese.

Often the steel rod (nominally 7 to 10 mm in diameter) is subjected to a surface hardening heat treatment to provide a suitable hardened layer to a depth of about 0.3 to 0.9 millimeters. In the case of suspension struts, this hardened case may be deeper on the piston employed in such devices. After the steel rod has been hardened, it is given an electroplated chromium coating. The depth of the coating again depends on the severity of use. In a typical shock absorber rod, the depth of the chromium electroplate may be from 0.005 to 0.01 mm, while the thickness of the chromium electroplate on a strut is typically a minimum of 0.01 mm. Following the deposit of the electroplated chromium layer, the layer is given a surface finish so as to assure the roundness, smoothness and uniform diameter of the overall rod for nonabrasive sealing engagement with the other elements of the suspension damping device. It is the purpose of this invention to replace the chromium plate with a suitable spray applied coating that provides equivalent corrosion resistance and abrasion resistance to the piston rod.

In accordance with the invention, thermal spray or kinetic spray techniques are employed. The invention will be illustrated in terms of preferred thermal spray practices.

Thermal spray techniques usually use powder or wire starting materials. The starting materials are melted by injecting them through a high temperature zone created by an electric arc process, a plasma process or a flame process. The molten powders are expelled from the high temperature zone and directed at high velocity at the piston rod surface to be coated. Individual molten droplets impact the component surface, cool and solidify, and form a solid coating. Although a fairly recent development, thermal spray processes have been utilized in industry in other applications for more than a decade. Typical uses are for aircraft engine components and for sheet metal joint fill of automobile bodies. In accordance with this invention, such practices are adapted to the provision of suitable coatings on piston rods.

In wire arc spraying, two wires of opposite polarity are fed through angled electrode holders in a spray gun so that their tips contact and generate an electric arc. The arc is at a temperature sufficient to provide thermal energy to melt the wires, and the molten metal is atomized by a jet of high pressure gas, usually compressed air, to provide a spray stream. The alloy to be sprayed is prepared in the form of a wire. This is usually a relatively inexpensive way of providing the spray material, and electric arc spraying is a relatively high production rate process. This process is limited to materials ductile enough to be drawn into a wire, or a cored wire may be formed for more brittle materials in powdered form inside of a ductile sheath.

There is another version of thermal spray process in which a wire is fed into the flame of a fuel-air mixture. The mixture is ignited to generate high temperatures, and the exhaust and air is used to propel the molten droplets from the wire to the substrate. One such process is termed the high velocity oxy-fuel (HVOF) process. In HVOF, high pressure fuel gas such as hydrogen, propane or propylene is mixed with air. High velocity flames can be generated at temperatures of the order of over 3000K. In the case of HVOF, the starting material may be fed in the form of a wire or a powder. The relatively high velocities can yield relatively low porosity coatings.

Plasma spraying provides very high temperatures of the order of 15,000K to 30,000K. In a plasma gun, the anode serves as the nozzle. The hollow anode contains located within it a conical cathode and an arc is formed between the anode and cathode. A plasma gas is flowed through the gun and through the arc between the cathode and anode. The gas is typically argon or a mixture of argon and hydrogen. A separate carrier gas that carries the particulate coating material is introduced into the plasma flame at the outlet of the gun and carried at high velocity against the roughened substrate to be coated.

Both plasma spray processes and wire arc spray processes have been used in the following specific examples to deposit coating materials on steel piston rods.

In accordance with the process that was followed in these examples, the UNS G10400 steel piston rods were cleaned and then roughened by grit blasting. The roughened steel surface provides a better bonding medium for the spray applied coating. After the coating is applied, the coated rods were subjected to a grinding operation to provide a round surface of uniform diameter along the length of the rod. Finally, some of the thermal applied metal alloy coatings were processed with suitable sealing treatments. As shown in FIG. 2, the thermal spray applied coating 32 is formed drop 34 by drop 34 or splat by splat. There is porosity in the coating. A typical spray coating has a density in the range of 90% to 99% of the theoretical density of the composition. Since automotive piston rods are subject to salt spray and the like, it is often necessary to seal the metal alloy coatings for suitable corrosion resistance.

In illustration of the invention, four metal alloy coatings containing chromium and transition metals were applied by thermal spray on shock and strut rods. The coatings were composed as follows:

Coating 1: Nickel-chromium-iron alloy composed of by weight 16.5% chromium, 4.5% iron, 4.25% silicon, 3.25% boron, 0.9% carbon and the balance nickel. The alloy was used in powder form (−140 to 325 mesh). This alloy was applied to steel (UNS G10400) piston rods by plasma thermal spray process to a thickness of 275 µm.

Coating 2: An iron-chromium-carbon alloy composed by weight of 27% chromium, 2.75% carbon, 1.75% nickel and the balance iron was also applied by a plasma spray process to steel (UNS G10400) piston rods to a thickness of 275 µm. The alloy was used in particulate form (−140 to 325 mesh).

Coating 3: An iron-chromium-aluminum alloy composed by weight of 22.3% chromium, 5.43% aluminum, 0.45% silicon, 0.03% carbon and the balance iron was applied by a wire arc spray process to steel (UNS G10400) piston rods. The coating was applied to a thickness of 275 μm.

Coating 4: An iron-chrome alloy (420 stainless steel) composed of by weight 13% chromium, 1% manganese, 1% silicon, 0.15% carbon minimum and the balance iron was applied by a wire arc spray process to steel (UNS G10400) piston rods. The coating was applied to a thickness of about 275 μm.

Coating 5: An alumina-ceramic composition was also formulated to contain 3% titania ($TiO_2$) and the balance alumina ($Al_2O_3$). This ceramic formulation was applied in powder form (−140 to 325 mesh) by plasma spray to the steel (UNS G10400) piston rods. The thickness of the coating was about 275 μm.

Several rods of each of the five coated compositions were ground to round uniform diameter along the length of the rods. Rods with each of the coatings displayed suitable abrasion resistance in the shock absorber or strut damper environment. However, a critical test for piston rods is their capability of resisting corrosion, particularly in a salt environment.

The corrosion resistance of each of the above five different coating composition-treated shock rods was tested in salt spray chambers according to the ASTM B117 testing method. It is deemed necessary to pass this test procedure in order for the rods to be considered suitable for commercial usage in the salt-type environment of, for example, North America.

The as-coated rods with metal alloys (that is, coatings 1 through 4) failed the salt spray tests. Due to the porosity of these coatings, the aqueous salt spray penetrated the pores of the coatings to cause unacceptable corrosion. However, when these metallic coatings were treated as described below, they passed the ASTM B117 testing procedure.

The shock rod that was plasma spray coated with the aluminatitania ceramic coating showed no unacceptable corrosion after salt spray testing. The rod had been subjected to post-deposition grinding but had no sealing treatment. While a sealing treatment could be employed with the alumina coating, the alumina coating of this thickness is suitable as deposited and as ground to size without further treatment.

Two types of post-thermal spray deposition treatment for the metal alloy-coated shock and strut rods were evaluated as follows. One postdeposition treatment was immersion of the coated and ground rods in a polymer sealant. Loctite Corporation #990 Porosity Spray Sealant is an example of a suitable sealant material. It is an anaerobic sealant (a polyglycol dimethacrylate base) of low viscosity that penetrates the pores and cures without air. The sealant can be applied, e.g., by spray, brushing or immersion of the coated rods. Other like polymer sealants are also suitable. The rods were drained dry and allowed to cure at room temperature.

The polymer-sealed, spray-coated rods were subjected to salt spray testing as described above. This polymer sealant treatment was successful in filling the pores of the chromium-iron-nickel based coating (Coating 1), the iron-chromium-carbon alloy (Coating 2), and the stainless steel alloy. Each of these polymer-sealed, coated shock absorber and strut rods passed the salt spray and abrasion tests. The polymer sealant was not sufficient to prevent corrosion of the iron-chromium-aluminum alloy (Coating 3).

In addition to the polymer sealant practice, it was also found that certain relatively low melting point alloys such as the chromium-iron-nickel alloy (liquidus temperature of about 1100 ° C.) could be sealed by subjecting the spray coated rods to a radio frequency induction heating to momentarily fuse the coating and collapse the pores to form a more continuous and dense coating. The nickel-chromium-iron alloys thus treated passed the salt spray test. The other alloys had liquidus temperatures that were too high for suitable processing in this way.

It is observed that the nickel-chromium-iron based alloy (Coating 1) could also be sealed at the same time that the underlying steel rod is case hardened.

Accordingly, it has been demonstrated that thermal spray coatings of certain metal alloys and certain electrically nonconductive ceramics can be applied to the surface of a steel or other suitable metal alloy piston rod for the purpose of providing a suitable abrasion-resistant and corrosion-resistant coating. Metal alloy materials may also be applied by a kinetic spray process. These spray coatings can be applied efficiently so as not to cause loss of material by overspray. The spray coatings do not create an environmental problem. The coatings are seen as suitable and effective replacements for the electroplated chrome, which while working well in use does present health and environmental problems in its application.

It will be appreciated that there could be a wide range of suitable coating materials for the piston rods. However, it is preferred that chromium be an element of the metal alloys and that chromium be used in a mixture with other transition element metals such as nickel and iron. The combination of nickel, chromium and iron or of iron, chromium and carbon are of sufficiently low temperature melting points for application to the steel rod and for subsequent effective sealing.

An equally effective embodiment is a nonmetallic coating of material such as alumina or alumina mixed with other oxides to reduce its thermal spray temperature. Since these ceramic coatings are essentially electrical insulators, they serve as suitable coatings despite their porosity. They provide corrosion resistance to the rod without a subsequent sealing step. Obviously, the coatings could be sealed with the polymer mixture as was demonstrated above.

While this invention has been described in terms of some specific embodiments, it will be appreciated that other forms can readily be adapted by one skilled in the art. Accordingly, the scope of this invention is to be considered limited only by the following claims.

What is claimed is:

1. An automotive suspension damper comprising a cylindrical housing member, sealing means atone end of said housing member for receiving a reciprocatable piston rod, a piston and a piston rod, said rod comprising a spray applied corrosion-resistant and abrasion-resistant surface layer, in which said surface layer is a thermally reflowed, thermal spray applied metal alloy porous coating capable of being finished to a smooth surface and wherein the material for said coating is selected from the group consisting of iron-chromium alloys and iron-nickel alloys.

2. A suspension damper for an automotive vehicle, said damper comprising a cylindrical housing member, sealing means at one end of said housing member for receiving a reciprocatable piston rod, a piston and a carbon steel piston rod, said rod comprising a spray applied corrosion-resistant and abrasion-resistant surface layer wherein said spray applied surface layer is a kinetic spray applied Porous coating capable of being finished to a smooth surface and wherein said coating is an alumina-based ceramic.

3. An automotive suspension damper comprising a cylindrical housing member, sealing means at one end of said housing member for receiving a reciprocatable piston rod, a piston and a carbon steel piston rod, said rod comprising a spray applied corrosion-resistant and abrasion-resistant surface layer, in which said surface layer is a thermally reflowed, thermal spray applied metal alloy porous coating capable of being finished to a smooth surface and wherein the material for said coating is selected from the group consisting of iron-chromium alloys and iron-nickel alloys.

4. An automotive suspension damper comprising a cylindrical housing member, sealing means at one end of said housing member for receiving a reciprocatable piston rod, a piston and a carbon steel piston rod, said rod comprising a spray applied corrosion-resistant and abrasion-resistant surface layer, in which said surface layer is a thermally reflowed, kinetic spray applied metal alloy porous coating capable of being finished to a smooth surface and wherein the material for said coating is selected from the group consisting of iron-chromium alloys and iron-nickel alloys.

5. An automotive suspension damper as recited in claim 3 wherein said coating is an iron-chromium carbon alloy.

6. An automotive suspension damper as recited in claim 3 wherein said coating is stainless steel.

* * * * *